US008226850B1

(12) United States Patent
Byun et al.

(10) Patent No.: US 8,226,850 B1
(45) Date of Patent: Jul. 24, 2012

(54) THERMALLY ENHANCED OXYGEN SCAVENGERS INCLUDING A TRANSITION METAL AND A FREE RADICAL SCAVENGER

(75) Inventors: Youngjae Byun, Central, SC (US); William S. Whiteside, Easley, SC (US)

(73) Assignee: Clemson University Research Foundation, Clemson, SC (US)

( * ) Notice: Subject to any disclaimer, the term of this patent is extended or adjusted under 35 U.S.C. 154(b) by 38 days.

(21) Appl. No.: 12/564,341

(22) Filed: Sep. 22, 2009

(51) Int. Cl.
C09K 15/08 (2006.01)
C09K 15/02 (2006.01)
H01J 7/18 (2006.01)
H01K 1/56 (2006.01)

(52) U.S. Cl. ............. 252/188.28; 252/181.3; 252/181.6; 252/400.53; 252/404

(58) Field of Classification Search ............. 252/188.28, 252/181.3, 181.6, 400.53, 404
See application file for complete search history.

(56) References Cited

U.S. PATENT DOCUMENTS

| | | | | |
|---|---|---|---|---|
| 3,795,708 A * | 3/1974 | Rappen et al. | | 568/772 |
| 4,026,664 A * | 5/1977 | Noack | | 422/16 |
| 4,060,561 A * | 11/1977 | Starks | | 568/763 |
| 4,250,335 A * | 2/1981 | Bitter et al. | | 568/771 |
| 4,536,409 A | 8/1985 | Farrell et al. | | |
| 5,256,311 A * | 10/1993 | Rossi et al. | | 210/750 |
| 5,284,871 A * | 2/1994 | Graf | | 514/499 |
| 5,350,622 A | 9/1994 | Speer et al. | | |
| 5,908,939 A * | 6/1999 | Baak et al. | | 549/407 |
| 6,254,804 B1 * | 7/2001 | Matthews et al. | | 252/188.28 |
| 6,303,801 B1 * | 10/2001 | Suzuki et al. | | 552/293 |
| 6,569,506 B1 | 5/2003 | Jerdee et al. | | |
| 6,709,724 B1 | 3/2004 | Teumac et al. | | |
| 6,818,151 B2 | 11/2004 | Yang et al. | | |
| 6,821,482 B1 | 11/2004 | Albert et al. | | |
| 7,052,628 B2 | 5/2006 | Schmidt et al. | | |
| 7,153,891 B2 | 12/2006 | Speer | | |
| 2002/0010347 A1 * | 1/2002 | Bonrath et al. | | 549/411 |
| 2005/0048287 A1 * | 3/2005 | Ebner et al. | | 428/411.1 |
| 2005/0072958 A1 * | 4/2005 | Powers | | 252/188.28 |

OTHER PUBLICATIONS

Related Applications Form.
ASTM Standard Test Method D3985, (Sep. 2010).
ASTM Standard Test Method E96-80, 1987.

* cited by examiner

Primary Examiner — Joseph D Anthony
(74) Attorney, Agent, or Firm — Dority & Manning, P.A.

(57) ABSTRACT

An oxygen scavenging system comprising a free radical scavenger (e.g., α-tocopherol, trimethylhydroquinone, ubiquinol, carotenoids, flavonoids, etc. and mixtures thereof) and a transition metal (e.g., iron (II), copper, manganese, cobalt, etc. and mixtures thereof) in a medium is generally provided. The medium containing the antioxidant and the transition metal has been thermally processed by heating to at least about 150° F. for at least about 10 minutes. Methods of removing oxygen from an environment surrounded by a medium containing the oxygen scavenging system and methods of making the oxygen scavenging system in a medium are also provided.

23 Claims, 3 Drawing Sheets

THERMALLY ENHANCED OXYGEN SCAVENGERS INCLUDING A TRANSITION METAL AND A FREE RADICAL SCAVENGER

BACKGROUND OF THE INVENTION

Food deterioration, such as the development of off-flavor, color and flavor changes, and nutritional losses, can be often caused by oxidation. Additionally, excessive oxygen in the packaging can cause the growth of aerobic bacteria or proliferation of molds.

Vacuum packaging has been widely used to eliminate oxygen in the packaging headspace. However, the oxygen that permeates from outside to headspace through packaging cannot be removed by this technique. Oxygen scavengers can remove the oxygen that permeates from outside into the headspace using chemical reactions. On the other hand, oxygen absorbers remove oxygen by physical trapping. Oxygen scavengers have been commercialized in the food packaging industries during recent decades. It is used in various forms; sachet, plastic film, labels, plastic trays, and bottle crowns.

There are several principles of oxygen scavengers, but the most widely used concepts are iron oxidation, ascorbic acid oxidation, and photosensitive dye oxidation. The most common and effective form of oxygen scavengers are based on the principle of iron oxidation. Iron-based oxygen scavengers are mostly used in sachet form, but future trends in active packaging are focused on the use scavenging compounds incorporated in the packaging film.

As such, a need exists for an efficient scavenging system for use in packaging.

SUMMARY OF THE INVENTION

Objects and advantages of the invention will be set forth in part in the following description, or may be obvious from the description, or may be learned through practice of the invention.

In general, the present disclosure is directed toward an oxygen scavenging system comprising a free radical scavenger (e.g., α-tocopherol, trimethylhydroquinone, ubiquinol, carotenoids, flavonoids, etc. and mixtures thereof) and a transition metal (e.g., iron (II), copper, manganese, cobalt, etc. and mixtures thereof) in a medium. The medium containing the free radical scavenger and the transition metal has been thermally processed by heating to at least about 150° F. for at least about 10 minutes.

The present disclosure is also generally directed to a method of removing oxygen from a closed environment. The method includes encloses the environment within a medium having the oxygen scavenging system described above.

Finally, a method of forming an oxygen scavenging system is generally provided. The method includes combining the free radical scavenger and a transition metal in a medium and thereafter thermally processing the medium to activate the oxygen scavenging system.

Other features and aspects of the present invention are discussed in greater detail below.

BRIEF DESCRIPTION OF THE DRAWINGS

A full and enabling disclosure of the present invention, including the best mode thereof to one skilled in the art, is set forth more particularly in the remainder of the specification, which includes reference to the accompanying figures, in which.

DETAILED DESCRIPTION OF THE INVENTION

Reference now will be made to the embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope or spirit of the invention. For instance, features illustrated or described as one embodiment can be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only, and is not intended as limiting the broader aspects of the present invention, which broader aspects are embodied exemplary constructions.

Generally speaking, the present disclosure is directed to an oxygen scavenging system and methods of making and using the same. In general, the oxygen scavenging system includes a transitional metal and a free radical scavenger (e.g., α-tocopherol, trimethylhydroquinone, ubiquinol, carotenoids, flavonoids, etc., and mixtures thereof).

The mechanism can be summarized by an initiation step that activates the available oxygen molecules through reaction with the transition metal (e.g., iron (II), copper, manganese, cobalt, etc. and mixtures thereof) to form oxygen free radicals. The scavenging step involves the reaction of the oxygen free radicals with a free radical scavenger (for example, α-tocopherol to form a tocopherol dimer and/or tocopheryl quinone). Specifically, the oxygen scavenging system of the present invention can use the free radical scavenger (e.g., α-tocopherol, trimethylhydroquinone, ubiquinol, carotenoids, flavonoids, etc.) to donate its electrons to scavenge the oxygen free radicals produced by the transition metal. When the free radical gains the electron from the free radical scavenger, it is returned to its ground state and the free radical is eliminated. Therefore, the oxygen content in the headspace will be reduced by these successive chemical reactions.

Figure 1:
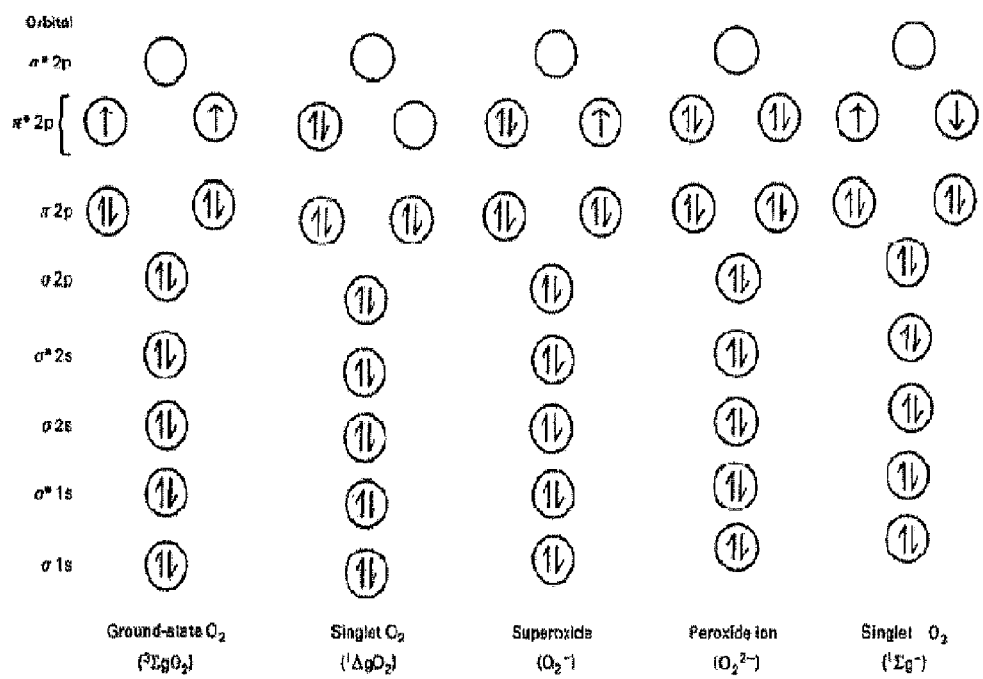
FIG. 1 shows a simplified version of bonding in the diatomic oxygen molecule and its derivatives.

For example, when the transition metal is iron (II) and the free radical scavenger is α-tocopherol, the oxygen scavenging mechanism can generally be shown according to the formula:

$$O_2 + Fe(II) \rightarrow O_2.^- + Fe(III)$$

$$O_2.^- + TocH \rightarrow Toc^- + HO_2.$$

$$HO_2. + TocH \rightarrow H_2O_2 + Toc.$$

$$2Toc. \rightarrow \text{dimer and other products}$$

$$Fe(II)+H_2O_2 \rightarrow Fe(III)+HO\cdot+OH^-$$

$$O_2\cdot^-+HO\cdot \rightarrow {}^1O_2{}^*+OH^-$$

$${}^1O_2{}^*+TocH \rightarrow Tocopheryl\ quinone$$

$$Fe(III)+H_2O_2 \rightarrow Fe(II)+O_2\cdot^-+H^+$$

where TocH represents α-tocopherol and Toc. represents α-tocopherol after loss of the hydrogen atom from the hydroxyl group. This mechanism can involve singlet oxygen, $^1O_2^*$, can be generated by input of energy or by reaction with superoxide and hydroxyl radical. If oxygen attempts to oxidize another atom or molecule by accepting a pair of electrons from it, both of these electrons must be of antiparallel spin so as to fit in to the vacant spaces in the π* orbitals. A simplified version of bonding in the diatomic molecule and its derivatives is shown in FIG. 1.

I. Transition Metal

The International Union of Pure and Applied Chemistry (IUPAC) defines a transition metal as an element whose atom has an incomplete d sub-shell. Many of the chemical and physical properties of the transition metals are based on their unfilled d orbital. In general, transition metals, also called the d-block elements, are the elements that make up Groups 3 through 12 of the periodic table. Most transition metals have variable valence, meaning that they have more than one possible oxidation state. For example, iron has two common oxidation states (+2, +3) represented by $Fe^{2+}$ and $Fe^{3+}$, respectfully.

The transition metal is selected in the oxygen scavenging system to activate any available oxygen molecules to an oxygen free radical. Suitable examples of transition metals include but are not limited to iron (II), copper, manganese, cobalt, etc. For example, if a solution of an iron (II) salt is exposed to the air, it slowly oxidizes to the iron (III) state, making it a good candidate for activation of oxygen molecules to an oxygen free radical in the present system.

According to the mechanism of the oxygen scavenging system, the transition metal first activates the oxygen molecule to the singlet electron state oxygen, $^1O_2^*$, which is not a radical because there are no unpaired electrons. However, singlet oxygen is highly reactive. Then, this singlet electron state oxygen undergoes subsequent reduction to reactive oxygen species (ROS), which is an oxygen free radical. "Reactive oxygen species" (ROS) is a collective term that includes oxygen radicals and non-radical derivatives of oxygen. A free radical may be defined as a molecule that has one or more unpaired electrons. Radicals can be formed when a covalent bond is broken if one electron from each of the pair shared remains with each atom. If oxygen attempts to oxidize another atom or molecule by accepting a pair of electrons from it, both of these electrons must be of antiparallel spin so as to fit in to the vacant spaces in the π* orbitals (see FIG. 1). The oxygen radicals include superoxide anion ($O_2\cdot^-$), hydroxyl (HO·), peroxy (ROO·), alkoxy (RO·), and hydroperoxy (HOO·) radicals. Non-radical derivatives include hydrogen peroxide ($H_2O_2$), ozone ($O_3$), and singlet oxygen ($^1O_2$).

The amount of transition metal (e.g., iron II) present in the system is greater than a catalytic amount. In fact, relatively high concentrations of the transition metal can lead to improved results by facilitating the transformation of oxygen to reactive oxygen species. The transitional metal can be present in the system in at least about 10% by weight, such as from about 20% to about 50% by weight of the total weight of the system (e.g., the combined weight of the transition metal and the free radical scavenger in the system). In one particular embodiment, the transitional metal can be present in the system from about 20% to about 30% by weight.

II. Thermal Processing

The activation of the oxygen molecules with the transition metal can be enhanced by thermal processing. Thermal processing can facilitate the activation of oxygen molecules to the reactive oxygen species (e.g., singlet electron state oxygen and/or oxygen free radicals). Without wishing to be bound by theory, it is believed that thermal processing can activate the oxygen scavenging system, and particularly the transition metal, to facilitate initiation of the oxygen involved reactions. Thus, thermal processing can facilitate and/or accelerate removal of oxygen by the oxygen scavenging system.

Thermal processing can involve heating the medium containing the oxygen scavenging system for a time sufficient to activate the system. The temperature and time the medium containing the oxygen scavenging system is exposed to elevated temperatures may vary according to the characteristics of the medium used. In most embodiments, however, thermal processing will involve heating the medium containing the oxygen scavenging system to at least about 150° F., such as from about 160° F. to about 250° F. for a period of at least 10 minutes (e.g., from about 15 minutes to about 1 hour).

III. Free Radical Scavenger

Free radical scavengers are compounds that react with free radicals and are themselves oxidized to generate generally innocuous nontoxic compounds. Free radical scavengers are a type of antioxidant known as chain-breaking antioxidants because the act to scavenge free radicals and inhibit chain initiation or break chain propagation. Vitamin E, ubiquinol, carotenoids, and flavonoids are major lipophilic chain-breaking antioxidants. Vitamin C, uric acid, bilirubin, and albumin are major hydrophilic chain-breaking antioxidants.

Tocopherols are the best known and most widely used antioxidants. Tocopherols work as an antioxidant by donating the hydrogen from the hydroxyl group to the lipid peroxyl radical. Natural vitamin E comprises eight different forms, the α-, β-, γ-, δ-tocopherols and the α-, β-, γ-, δ-tocotrienols. Among those compounds, α-tocopherol has the highest chemical reactivity, free radical scavenging reactivity, singlet oxygen ($^1O_2$) scavenging reactivity, and biological activity. Thus, α-tocopherol is a strong free radical scavenger. It also can react irreversibly with singlet oxygen and produce tocopherol hydroperoxydienone, tocopherylquinone, and quinine epoxide α-tocopheryl has the general formula:

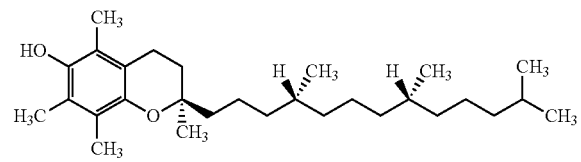

α-tocopherol reacts with peroxy radicals as a free radical scavenger. It donates its hydrogen atom at the 6-hydroxyl group on the chromanol ring to the free radicals. Alkyl hydroperoxide and an α-tocopheryl radical are produced by this reaction. The α-tocopheryl radical is stabilized through the resonance structure of the aromatic ring. This radical can react with a peroxy radical to produces α-tocopherol peroxide or it can reacts with another α-tocopheryl radical and produce a α-tocopherol dimmers.

Another particularly suitable free radical scavenger for use in the oxygen scavenging system is trimethylhydroquinone (TMHQ), which is a precursor to the synthetic α-tocopherol. Trimethylhydroquinone can be represented by the following formula:

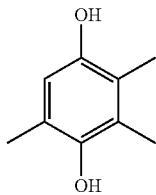

The free radical scavenger can be present in the system in an amount of at least about 20% by weight, such as from about 20% to about 60% by weight, of the total weight of the system.

IV. Medium

The oxygen scavenging system can be included in a medium for removing oxygen from the environment protected by the medium. Suitable mediums include but are not limited to polymeric films, fibrous sheets (e.g., woven or knitted fibrous webs, nonwoven webs, etc.), plastic coatings, paints, etc. When made of a polymeric material, the medium can include synthetic polymers (e.g., polyolefins such as polyethylene, polypropylene, and copolymers thereof; polyesters; polyurethanes; etc., and copolymers thereof such as polyethylene terephthalate) and/or natural polymers (e.g., cellulose fibers, biopolymers, etc.).

EXAMPLES

Materials

α-tocopherol (96.2%, Mw 430.7) was purchased from EMD Bioscience (CA. USA).

Trimethylhydroquinone (97%, TMHQ) was purchased from Sigma-Aldrich (MO, USA).

Iron chloride (II), tetrahydrate was purchased from J. T. Baker (NJ, USA).

Retortable plastic cups with 3% EVOH barrier were provided from Printpack (GA, USA). 48 ga PET/60 ga Foil/3 mil CPP film was used as cup lids.

Sample Preparation

α-tocopherol with different amounts of transition metal (0, 50, 100, 150 mg) and with or without water were placed inside a high oxygen barrier retortable cup with 115 cc of ambient air (20.90% O2). The cup was sealed with PET/Foil/CPP film using Lab sealer (Packaging Technologies, IA, USA). The sealing temperature was 470° F. with 60 psi pressure at 1 second dwell time.

Thermal Processing

A pilot-scale rotary, single cage, water spray retort in static mode was employed in this research. Samples were thermally processed for 30 minute at 170° F. using a Surdry Model APR-95 Rotary Pilot Retort (Stock America, NC, USA).

Oxygen Content Analysis

The oxygen content in the cup headspace was analyzed by a headspace oxygen/carbon dioxide analyzer (model 6600, Illinois Instrument, IL, USA). A sampling needle with a 0.45 μm PTFE filter was inserted and 15 cc headspace gases were sampled through a septum. Calibration of headspace analyzer was done using ambient air after each sample measurement. All of the samples were measured in triplicate at day 0, 1, 4, 7, 14, 30, and 60.

Statistical Analysis

Statistics on a completely randomized design were performed with the analysis of variance (ANOVA) using SAS (version 9.1, SAS Institute Inc., Cary, N.C., USA) and differences among mean values were processed by Duncan's multiple range test.

Significance was defined at a level of $P<0.05$.

Results and Discussion

Oxygen content (%) reduction during storage time: This study was designed to assess the influence of mixture variables on oxygen content (%) reduction. Nine batches with different composition in the scavenger mixture were prepared (Table 1). Eleven batches are shown on Table 1, but batch A-T-R and A-R were used twice with different name of A-T100-R and A-T0-R, respectively:

TABLE 1

| Code | α-tocopherol (A, mg) | Transition metal (T, mg) | Thermal Processing (R, ° F.) | Water (H, ul) |
|---|---|---|---|---|
| A-T-R | 500 | 100 | 170 | — |
| T-R | — | 100 | 170 | — |
| A-R | 500 | — | 170 | — |
| A-T | 500 | 100 | — | — |
| A-T-R-H | 500 | 100 | 170 | 50 |
| A-T0-R | 500 | — | 170 | — |
| A-T50-R | 500 | 50 | 170 | — |
| A-T100-R | 500 | 100 | 170 | — |
| A-T150-R | 500 | 150 | 170 | — |

| Code | TMHQ (TM, mg) | Transition metal (T, mg) | Thermal Processing (R, ° F.) | Water (H, ul) |
|---|---|---|---|---|
| TM-T-R | 500 | 100 | 170 | — |
| TM-T-R-H | 500 | 100 | 170 | 50 | where A is α-tocopherol, T is the transition metal (iron (II)), R is thermal processing, and H is water; T0 is 0 mg of transition metal, T50 is 50 mg of transition metal, T100 is 100 mg of transition metal, and T150 is 150 mg of transition metal; and TM is trimethylhydroquinone (TMHQ).

The oxygen content (%) in the headspace of all batches decreased during the storage time (Table 2):

TABLE 2

|  | Day 0 | Day 1 | Day 4 | Day 7 | Day 14 | Day 30 | Day 60 |
|---|---|---|---|---|---|---|---|
| A-T-R | $20.90 \pm 0.00^a$ | $20.37 \pm 0.06^b$ | $20.20 \pm 0.00b^c$ | $19.97 \pm 0.12^{cd}$ | $19.93 \pm 0.32^d$ | $19.17 \pm 0.06^e$ | $18.03 \pm 0.06^f$ |
| T-R | $20.90 \pm 0.00^a$ | $20.40 \pm 0.10^b$ | $20.90 \pm 0.00^a$ | $20.47 \pm 0.06^b$ | $20.47 \pm 0.06^b$ | $19.83 \pm 0.29^c$ | $18.83 \pm 0.15^d$ |
| A-R | $20.90 \pm 0.00^a$ | $20.47 \pm 0.06^{bc}$ | $20.53 \pm 0.06^b$ | $20.43 \pm 0.06^b$ | $20.43 \pm 0.06^{bc}$ | $20.40 \pm 0.00^c$ | $20.43 \pm 0.12^{bc}$ |
| A-T | $20.90 \pm 0.00^a$ | $20.90 \pm 0.00^a$ | $20.90 \pm 0.00^a$ | $20.47 \pm 0.06^{ab}$ | $20.23 \pm 0.15^b$ | $19.63 \pm 0.12^c$ | $18.40 \pm 0.70^d$ |
| A-T-R-H | $20.90 \pm 0.00^a$ | $20.33 \pm 0.12^b$ | $20.13 \pm 0.15^b$ | $19.90 \pm 0.26^{bc}$ | $19.60 \pm 0.52^c$ | $18.53 \pm 0.12^d$ | $17.83 \pm 0.35^e$ |
| A-T0-R | $20.90 \pm 0.00^a$ | $20.47 \pm 0.06^{bc}$ | $20.53 \pm 0.06^b$ | $20.43 \pm 0.06^{bc}$ | $20.43 \pm 0.06^{bc}$ | $20.40 \pm 0.00^c$ | $20.43 \pm 0.12^{bc}$ |
| A-T50-R | $20.90 \pm 0.00^a$ | $20.40 \pm 0.10^{ab}$ | $20.33 \pm 0.06^{ab}$ | $20.20 \pm 0.10^{ab}$ | $20.03 \pm 0.31^{bc}$ | $19.23 \pm 0.47^d$ | $19.43 \pm 0.90^{cd}$ |
| A-T100-R | $20.90 \pm 0.00^a$ | $20.37 \pm 0.06^b$ | $20.20 \pm 0.00^{bc}$ | $19.97 \pm 0.12^{cd}$ | $19.93 \pm 0.32^d$ | $19.17 \pm 0.06^e$ | $18.03 \pm 0.6^f$ |
| A-T150-R | $20.90 \pm 0.00^a$ | $20.40 \pm 0.00^b$ | $20.20 \pm 0.00^b$ | $19.87 \pm 0.06^c$ | $19.33 \pm 0.06^d$ | $18.13 \pm 0.29^e$ | $17.10 \pm 0.20^f$ |

TABLE 2-continued

| | Day 0 | Day 1 | Day 4 | Day 7 | Day 14 | Day 30 | Day 60 |
|---|---|---|---|---|---|---|---|
| TM-T-R | $20.90 \pm 0.00^a$ | $20.37 \pm 0.15^b$ | $20.30 \pm 0.10^b$ | $20.37 \pm 0.15^b$ | $20.37 \pm 0.15^b$ | $20.00 \pm 0.17^c$ | $19.57 \pm 0.15^d$ |
| TM-T-R-H | $20.90 \pm 0.00^a$ | $19.60 \pm 0.26^{ab}$ | $18.67 \pm 0.60^b$ | $18.30 \pm 0.46^b$ | $18.03 \pm 0.58^b$ | $18.30 \pm 1.47^b$ | $18.37 \pm 2.14^b$ | where the results are expressed as the mean±SD (n=3). The different letters within same row differ significantly (p<0.05).

However, there was no oxygen content (%) reduction on batch A-T until day 4. In this case, a lag time can be seen before the scavenger starts to reduce oxygen content (%). Batch A-T150-R showed the highest oxygen content (%) reduction and batch A-R (A-T0-R) showed the lowest reduction in oxygen content (%).

Effects of α-tocopherol, transition metal, thermal processing, and moisture on oxygen scavenging capability: In this study, oxygen content (%) in the headspace may have been reduced by a successive chemical reaction. There are two chemical reaction steps (Scheme 1 (b)). In first step, oxygen free radicals are produced in the presence of a transition metal. In the second step, the oxygen free radicals are eliminated by receiving electrons from α-tocopherol. Therefore, the presence of both the transition metal and α-tocopherol are essential conditions for the oxygen scavenger mixture. Furthermore, thermal processing can accelerate oxygen scavenging reaction.

Figure 2:
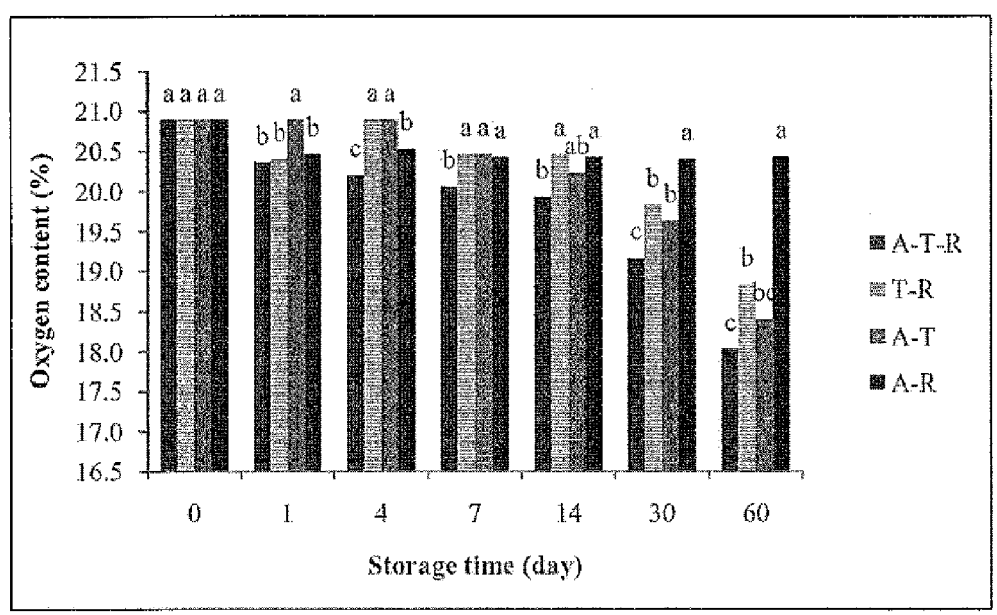
FIG. 2 shows the influences of the α-tocopherol, thermal processing, and transition metal on oxygen scavenging capability ($p<0.05$) according to Example 1.

The effects of α-tocopherol, transition metal, and thermal processing on the oxygen scavenging capability have been investigated (FIG. 1). The oxygen content (%) on batch A-T-R was significantly lower than the others over the entire storage time. This suggests that α-tocopherol and transition metal with thermal processing eliminate oxygen effectively. Batch T-R and A-T had higher oxygen content than batch A-T-R. There was no free radical scavenging reactions and no acceleration in initiation step on batch T-R and A-T, respectively (Scheme 1 (b)). α-tocopherol and thermal processing were required for optimum oxygen scavenging capability and for the acceleration of the oxygen scavenging reaction, respectively. Otherwise, the oxygen scavenging capability decreased. The oxygen content (%) on batch A-R was significantly higher than the other batches at day 60, indicating that the oxygen scavenger mixture without transition metal had the lowest oxygen scavenging capability. There was no initiation step on batch A-R. Therefore, a transition metal was required for optimum oxygen scavenging capability. In addition, the effect of moisture on oxygen scavenging capability has been investigated (FIG. 2). There was no significant difference in oxygen content (%) between batch A-T-R and A-T-R-H during storage time, except for day 30. Thus, the addition of moisture did not affect the oxygen scavenging capability.

Figure 3:
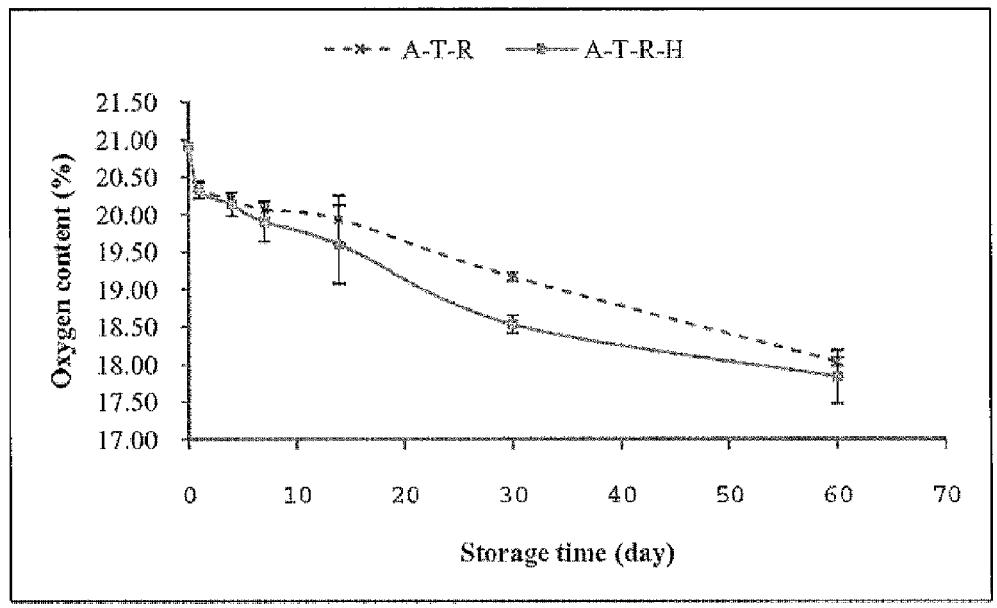
FIG. 3 shows the influence of moisture on oxygen scavenging capability according to Example 1.

Effect of the amount of transition metal: It was observed that batch A-T150-R showed the highest oxygen scavenging capability (FIG. 3). The oxygen scavenging capability was increased when the amount of transition metal in scavenger mixture was increased from 0 to 150 mg at day 60.

Figure 4:
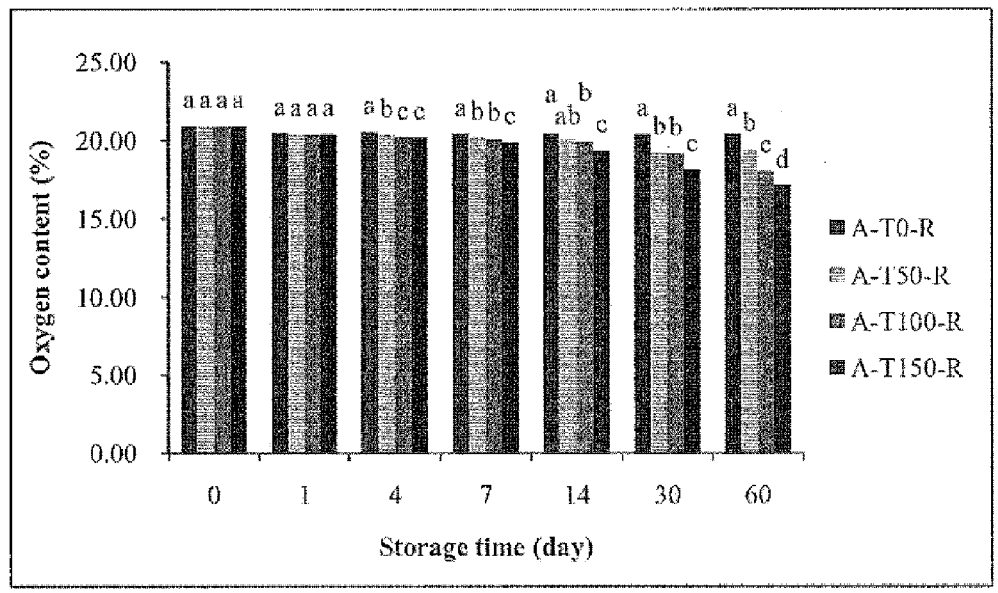
FIG. 4 shows the influence of the amount of transition metal on oxygen scavenging capability ($p<0.05$) according to Example 1.
Figure 5:
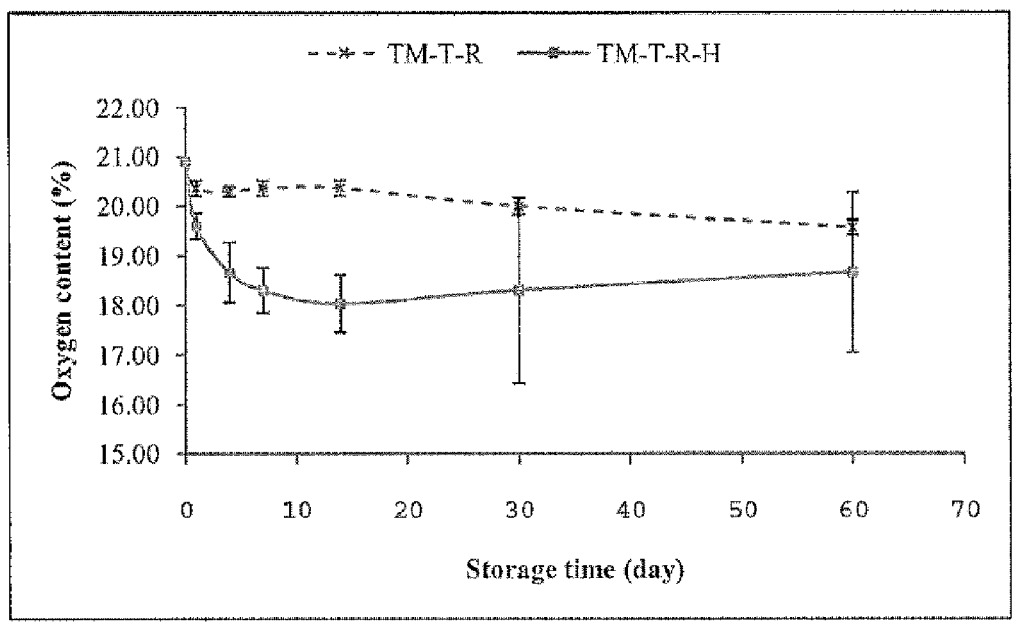
FIG. 5 shows the influence of moisture on oxygen scavenging capability of TMHQ and transition metal according to Example 1.

TMHQ with transition metal as an oxygen scavenger: The free radical scavenging activity of α-tocopherol is derived from a chromanol ring structure (Smirnoff, 2005). The synthetic vitamin E is produced by a chemical reaction of trimethylhydroquinone (TMHQ) with isophytol. TMHQ has two hydroxyl groups on its ring structure whereas α-tocopherol has one hydroxyl group on its chromanol ring structure (FIG. 4). In this research, TMHQ and a transition metal as an oxygen scavenger was also investigated (FIG. 5). In addition, the effect of moisture on oxygen scavenging also investigated. The oxygen content (%) reduction on batch TM-TR-H was significantly higher than that on batch TM-T-R until day 14. TMHQ with moisture showed better oxygen scavenging capability than one without moisture. However, there were no significant differences in oxygen scavenging capability between batch TM-T-R and TM-T-R-H after day 30.

Conclusion: The oxygen content (%) in the headspace of all batches decreased during storage time. α-tocopherol and transition metal were required for optimum oxygen scavenging capability. Otherwise, the oxygen scavenging capability decreased. The oxygen scavenging capability was increased when the amount of transition metal was increased. Thermal processing can accelerate the oxygen scavenging reaction. Adding moisture did not affect the oxygen scavenging capability. Generally, the scavenging capacity can be as low as 1 cc O2 per gram and the scavenging rate can be 0.1 cc O2 per gram per day. In this research, the oxygen scavenging capacity and rate were calculated by initial oxygen content and oxygen content at day 60. α-tocopherol and transition metal had 6.72 cc O2 per gram of oxygen scavenging capacity and 0.11 cc O2 per gram per day of oxygen scavenging rate. In addition, TMHQ was tested instead of α-tocopherol in the oxygen scavenger mixture. This scavenging mixture had 4.86 cc O2 per gram of oxygen scavenging capacity and 0.10 cc O2 per gram per day of oxygen scavenging rate. These results demonstrate that the oxygen scavenger mixture containing α-tocopherol or TMHQ and transition metal with thermal processing can be used as an oxygen scavenger. TMHQ is somewhat less effective than α-tocopherol.

GENERAL CONCLUSIONS

An oxygen scavenger mixture containing α-tocopherol and a transition metal was developed as an oxygen scavenger. The oxygen scavenger mixture eliminates the headspace oxygen effectively by a successive chemical reaction, not by the physical entrapment of oxygen. Oxygen free radicals produced by the reaction of oxygen with a transition metal and α-tocopherol eliminates the oxygen free radical by donating their electrons to the free radical. In addition, thermal processing accelerates the oxygen scavenging reaction, while the addition of moisture did not affect the oxygen scavenging capability.

These and other modifications and variations to the present invention may be practiced by those of ordinary skill in the art, without departing from the spirit and scope of the present invention, which is more particularly set forth in the appended claims. In addition, it should be understood the aspects of the various embodiments may be interchanged both in whole or in part. Furthermore, those of ordinary skill in the art will appreciate that the foregoing description is by way of example only, and is not intended to limit the invention so further described in the appended claims.

What is claimed:

1. An oxygen scavenging system comprising an oxygen scavenger and a transition metal, the oxygen scavenging system being in a medium, wherein a free radical scavenger is the only oxygen scavenger in the oxygen scavenging system, the oxygen scavenging system comprising the transition metal in an amount of at least about 10% by weight of the oxygen scavenging system, wherein the medium containing the free radical scavenger and the transition metal is a polymeric medium or a fibrous sheet and has been thermally processed by heating to at least about 150° F. for at least about 10 minutes.

2. The oxygen scavenging system as in claim 1, wherein the free radical scavenger comprises α-tocopherol, trimethylhydroquinone, ubiquinol, carotenoids, flavonoids, or mixtures thereof.

3. The oxygen scavenging system as in claim 1, wherein the free radical scavenger comprises α-tocopherol.

4. The oxygen scavenging system as in claim 1, wherein the free radical scavenger comprises trimethylhydroquinone.

5. The oxygen scavenging system as in claim 1, wherein the transition metal comprises iron (II), copper, manganese, cobalt, or mixtures thereof.

6. The oxygen scavenging system as in claim 1, wherein the transition metal comprises iron (II).

7. The oxygen scavenging system as in claim 1, wherein the medium has been thermally processed by heating from about 160° F. to about 250° F. for from about 15 minutes to about 1 hour.

8. The oxygen scavenging system as in claim 1, wherein the medium comprises a polymeric material.

9. A method of removing oxygen from a closed environment, the method comprising
enclosing the environment within the medium, wherein the medium comprises the oxygen scavenging system according to claim 1.

10. The method as in claim 9, wherein the free radical scavenger comprises α-tocopherol, trimethylhydroquinone, ubiquinol, carotenoids, flavonoids, or mixtures thereof.

11. The method as in claim 9, wherein the free radical scavenger comprises α-tocopherol.

12. The method as in claim 9, wherein the free radical scavenger comprises trimethylhydroquinone.

13. The method as in claim 9, wherein the transition metal comprises iron (II), copper, manganese, cobalt, or mixtures thereof.

14. The method as in claim 9, wherein the transition metal comprises iron (II).

15. The method as in claim 9, wherein the medium has been thermally processed by heating from about 160° F. to about 250° F. for from about 15 minutes to about 1 hour.

16. The method as in claim 9, wherein the medium comprises a polymeric material.

17. A method of forming an oxygen scavenging system, the method comprising
combining an oxygen scavenger and a transition metal to form the oxygen scavenging system, wherein a free radical scavenger is the only oxygen scavenger in the oxygen scavenging system, the oxygen scavenging system comprising the transition metal in an amount of at least about 10% by weight of the oxygen scavenging system;
adding the oxygen scavenging system to a medium, wherein the medium is a polymeric medium or a fibrous sheet; and
thereafter, thermally processing the medium to activate the oxygen scavenging system by heating to at least about 150° F. for at least about 10 minutes.

18. The method as in claim 17, wherein the free radical scavenger comprises α-tocopherol, trimethylhydroquinone, ubiquinol, carotenoids, flavonoids, or mixtures thereof.

19. The method as in claim 17, wherein the free radical scavenger comprises α-tocopherol.

20. The method as in claim 17, wherein the free radical scavenger comprises trimethylhydroquinone.

21. The method as in claim 17, wherein the transition metal comprises iron (II).

22. The method as in claim 17, wherein the medium has been thermally processed by heating from about 160° F. to about 250° F. for from about 15 minutes to about 1 hour.

23. The method as in claim 17, wherein the medium comprises a polymeric material.

* * * * *